US012628224B2

(12) United States Patent
Rydén

(10) Patent No.: US 12,628,224 B2
(45) Date of Patent: May 12, 2026

(54) METHODS FOR IMPROVED FEDERATED MACHINE LEARNING IN WIRELESS NETWORKS

(71) Applicant: Telefonaktiebolaget LM Ericsson (publ), Stockholm (SE)

(72) Inventor: Henrik Rydén, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 302 days.

(21) Appl. No.: 18/281,594

(22) PCT Filed: Mar. 25, 2021

(86) PCT No.: PCT/EP2021/057842
§ 371 (c)(1),
(2) Date: Sep. 12, 2023

(87) PCT Pub. No.: WO2022/199824
PCT Pub. Date: Sep. 29, 2022

(65) Prior Publication Data
US 2024/0155714 A1 May 9, 2024

(51) Int. Cl.
*H04W 76/19* (2018.01)
*G06N 20/00* (2019.01)
(Continued)

(52) U.S. Cl.
CPC ............ *H04W 76/15* (2018.02); *G06N 20/00* (2019.01); *H04W 36/0069* (2018.08); *H04W 76/19* (2018.02)

(58) Field of Classification Search
None
See application file for complete search history.

(56) References Cited

U.S. PATENT DOCUMENTS

2019/0124711 A1    4/2019  Dai
2021/0049451 A1    2/2021  Wang et al.
(Continued)

FOREIGN PATENT DOCUMENTS

WO          2017162262 A1    9/2017
WO    WO-2020080989 A1 *    4/2020    ............. G06N 3/006

OTHER PUBLICATIONS

International Search Report and Written Opinion for International Patent Application No. PCT/EP2021/057842, mailed Dec. 22, 2021, 13 pages.

*Primary Examiner* — Idowu O Osifade
(74) *Attorney, Agent, or Firm* — Withrow & Terranova, PLLC

(57) ABSTRACT

A computer implemented method for federated machine learning, FL, in a wireless communication system, the method comprising establishing a first wireless access radio link between a first access node and a wireless device, initiating an FL process involving the first access node and the wireless device, transmitting FL information from the first access node to the wireless device, where the FL information comprises data indicative of the FL process, establishing a second wireless access radio link between a second access node and the wireless device, where the second access node is communicatively coupled to the first access node, exchanging at least part of the FL information between the wireless device and the second access node, and resuming the FL process involving the first access node and the wireless device by communication via the second access node over the second wireless access radio link.

20 Claims, 5 Drawing Sheets

(51) Int. Cl.
   *H04W 36/00*      (2009.01)
   *H04W 76/15*      (2018.01)

(56)               References Cited

U.S. PATENT DOCUMENTS

2022/0103221  A1 *   3/2022  Taherzadeh Boroujeni  ...............
                                               G06N 3/063
2022/0377614  A1 *  11/2022  Balakrishnan  ....  H04W 28/0925
2023/0019669  A1 *   1/2023  Alabbasi  .................. G06N 3/08

* cited by examiner

300

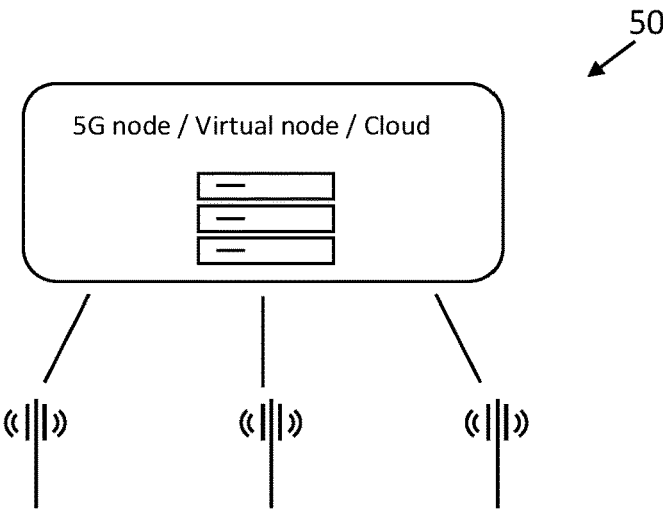
FIG. 5
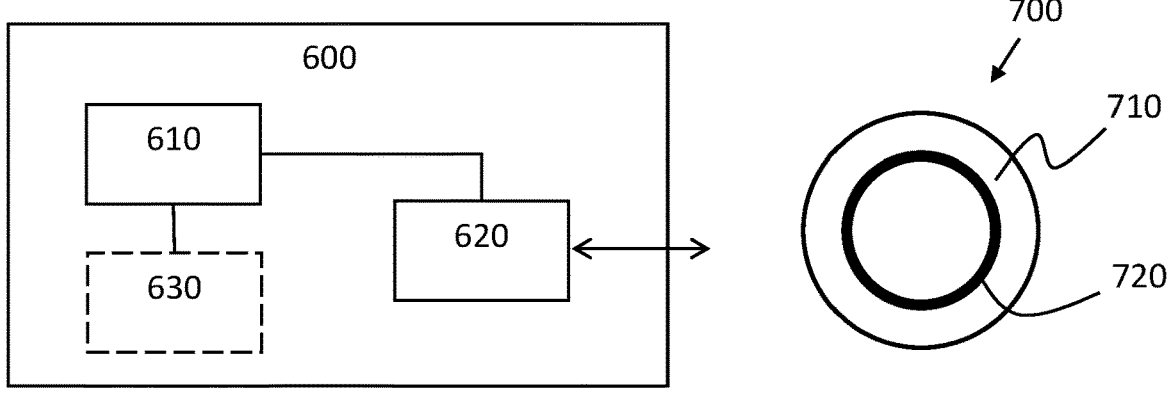
FIG. 6
FIG. 7
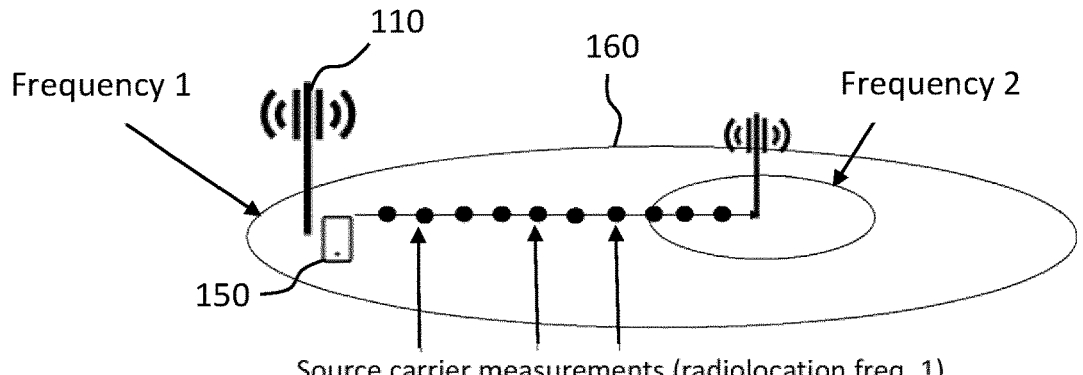
FIG. 8

METHODS FOR IMPROVED FEDERATED MACHINE LEARNING IN WIRELESS NETWORKS

TECHNICAL FIELD

The present disclosure relates to machine learning in wireless communication networks comprising a plurality of access points and one or more wireless devices which are serviced from the access points over wireless radio access links. There are disclosed methods, network nodes, wireless devices, computer programs and computer program products for, e.g., data collection and data analysis based on federated machine learning methods.

BACKGROUND

Machine learning relates generally to techniques where a model having a certain pre-determined structure is adapted to provide a desired function by means of some form of training mechanism. Machine learning techniques have gained tremendous interest over recent years due to the versatility and adaptability of the methods in different types of applications. Some example machine learning structures comprise neural networks, autoencoder networks, and random forest structures. For instance, WO2017/162262 A1 discusses the use of machine learning methods for predicting radio performance on different radio carriers.

Federated learning (FL), also known as collaborative learning, is a machine learning technique in which a machine learning function is trained across multiple decentralized edge devices which have access to respective local data samples, without the edge devices exchanging those data samples with a central server or with other edge devices. This approach stands in contrast to traditional centralized machine learning techniques where all the local datasets are uploaded to one server for central processing. The approach is also different from decentralized machine learning techniques where data samples are exchanged among edge devices. Since FL enables multiple actors to build a common and robust machine learning model without sharing data, critical issues such as data privacy, data security, data access rights and access to heterogeneous data are inherently addressed, which is an advantage.

The training of FL models often requires multiple training rounds, where each training round involves signaling to and from the edge devices. When wireless devices in a wireless access network are participating in the FL process, there are several issues that can occur which have an adverse effect on performance. For example, a wireless device may go into idle mode, and thus not be available for all rounds in the FL process, which can cause undesired interruptions in the FL process and thus introduce latencies in the model training.

There is a need for FL techniques specifically adapted for use in wireless communication networks comprising mobile wireless devices.

There is also a need for improving robustness and data integrity associated with FL processes in wireless access network.

SUMMARY

It is an object of the present disclosure to provide methods for federated learning which alleviates or even resolves some of the above-mentioned issues. This object is obtained by a computer implemented method for federated machine learning (FL) in a wireless communication system. The method comprises establishing a first wireless access radio link between a first access node and a wireless device, initiating an FL process involving the first access node and the wireless device and transmitting FL information from the first access node to the wireless device, where the FL information comprises data indicative of the FL process. The method also comprises establishing a second wireless access radio link between a second access node and the wireless device, where the second access node is communicatively coupled to the first access node, exchanging at least part of the FL information between the wireless device and the second access node, followed by resuming the FL process involving the first access node and the wireless device by communication via the second access node over the second wireless access radio link.

This way an FL process may be resumed via relay over a second access node. This is an advantage, since the first access node can update its global FL model using the data available locally at the wireless device, which otherwise would have been out of reach from the first access node. The accuracy of the FL model is thus improved.

The wireless communication system is optionally a system operating according to a standard defined by the third generation partnership program (3GPP).

According to aspects, the initiated FL process comprises training a machine learning function based on channel state information (CSI) data obtained locally by the wireless device 150. Machine learning processes involving CSI data are advantageously implemented using FL techniques, since there is no need to communicate the large size CSI data sets. Also, privacy issues are more easily handles in FL processes since the CSI information is not communicated from the wireless device, which is an advantage.

According to aspects, the initiated FL process comprises training a machine learning function based on radiolocation and/or geolocation data obtained locally by the wireless device. ML involving the location of the wireless device is naturally associated with issues related to privacy and security. By using FL techniques, such issues are not as pronounced since the raw data stays local to the wireless device.

The method is optionally performed in response to an anticipated interruption of the initiated FL process. The system is often able to determine a-priori that an interruption is about to take place. For instance, the wireless device may initiate preparations for powering down, entering into an idle-mode of operation, or for starting a handover process. The wireless device may also detect a risk of entering into a recovery mode of operation due to declaring radio-link failure. The system can then trigger the transfer of the FL information on-demand, which reduces signalling overhead associated with the methods discussed herein.

The FL information optionally comprises any of an FL process identifier, a priority metric indicating a priority of the FL process relative to one or more other FL processes in the wireless communication system, an FL process training round indicator value, a use-case description associated with the FL process, a set of global FL model weights associated with the FL process, an instruction to store a dataset of the FL process, or a part of a dataset of the FL process, an instruction indicating when stored FL process data can be deleted by the wireless device, an instruction indicating a set of access nodes in the wireless communication system (100, 200) with which FL information can be shared, and/or an instruction associated with encryption of the model parameters when communicating with the second node. The exact contents of the FL information can be adjusted in dependence of the FL application and other system parameters, which is an advantage.

According to aspects, the method also comprises connecting the second access node to the first access node via a core network. A first access node communicatively coupled to a second access node via a core network are able to communicate with each other in a robust manner, often involving high throughput optical fibre communication links, which is an advantage, since FL data can be exchanged reliably, and with low latency.

According to aspects, the method comprises the second access node requesting the wireless device to provide the FL information. Thus, as the wireless device connects to the second access node, the second access node polls the wireless device for any FL information, and the wireless device may then share the FL information on demand. This reduces overhead signalling in the network. Also, the method provides a level of backwards compatibility, since only network nodes capable of acting as FL relay will transmit this request for FL information to the wireless device.

According to aspects, the method comprises transmitting information from the wireless device to the second access node indicative of a set of access nodes where the wireless device has participated in an FL process. The second access node may then, e.g., determine whether to start acting as FL relay by communicating requests to the different access nodes in the list.

According to aspects, the method comprises determining a throughput metric for communication between the wireless device and the first access node via the second access node prior to resuming the FL process between the first access node and the wireless device. This way a situation where the data communication capacity between the first access node and the second access node is too small for facilitating the FL relay function in a reliable manner can be avoided. The first access node may take the throughput metric into account when deciding whether to resume the FL process with the wireless device or not.

According to aspects, the method comprises determining a relevance metric associated with a local data set of the wireless device for the FL process prior to resuming the FL process between the first access node and the wireless device. The first access node may have more use for resuming the FL process with the wireless device in case its data is relevant compared to the case where the wireless device only has less relevant data.

According to aspects, the method comprises determining an energy storage state of the wireless device prior to resuming the FL process between the first access node and the wireless device. The FL process may consume significant energy. Thus, if the wireless device risks depleting its energy store due to the FL process, the resumption may be postponed or aborted.

According to aspects, the method comprises transmitting an instruction to the wireless device to delete a local data set related to the FL process. This frees up local data storage, and also improves privacy and data integrity, which is an advantage.

There is also disclosed herein access nodes and wireless devices along with corresponding methods, as well as computer programs and computer program products associated with the above-mentioned advantages.

BRIEF DESCRIPTION OF THE DRAWINGS

The present disclosure will now be described in more detail with reference to the appended drawings, where:

FIG. 5 schematically illustrates a general network function.

FIG. 6 schematically illustrates processing circuitry;

FIG. 7 shows a computer program product; and

FIG. 8 illustrates a wireless device performing source carrier measurements.

DETAILED DESCRIPTION

Figure 1:
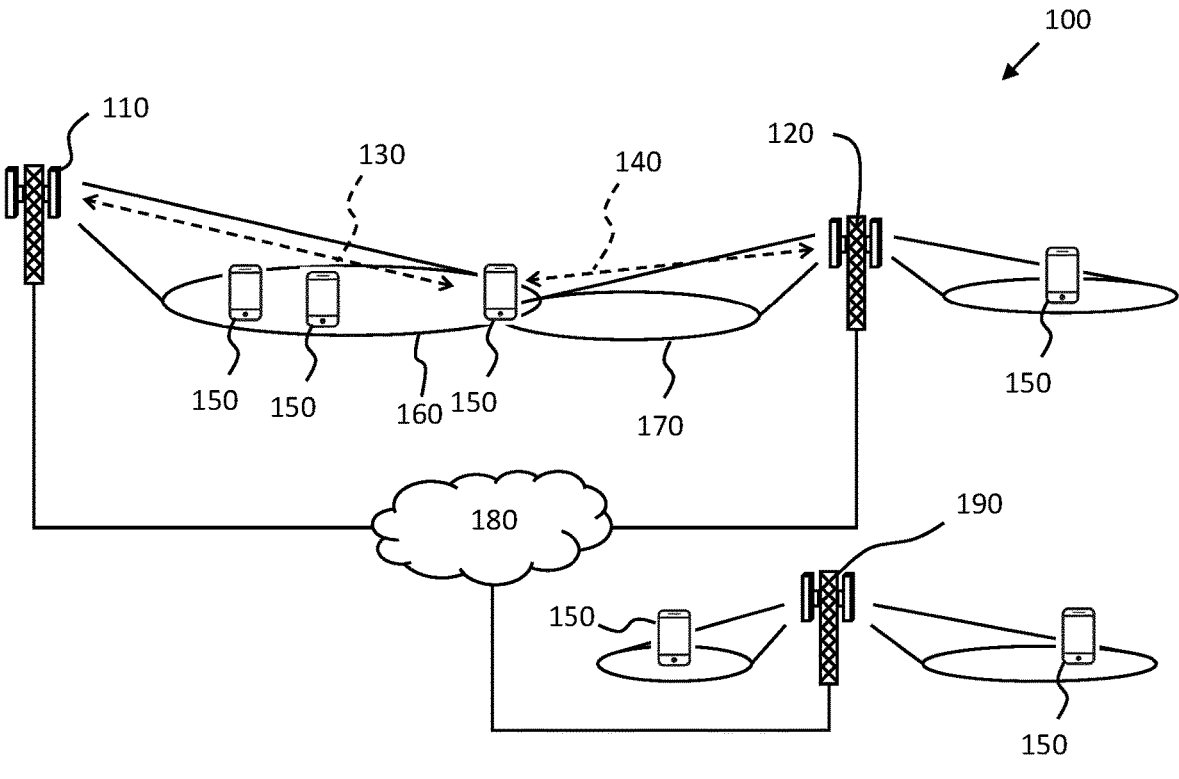
FIG. 1 shows an example communication network built around a core network.

Aspects of the present disclosure will now be described more fully hereinafter with reference to the accompanying drawings. The different devices, systems, computer programs and methods disclosed herein can, however, be realized in many different forms and should not be construed as being limited to the aspects set forth herein. Like numbers in the drawings refer to like elements throughout.

The terminology used herein is for describing aspects of the disclosure only and is not intended to limit the invention. As used herein, the singular forms "a", "an" and "the" are intended to include the plural forms as well, unless the context clearly indicates otherwise.

FIG. 1 schematically illustrates an example communication system 100 comprising radio access network nodes 110, 120, 190 which provide wireless access 130, 140 to wireless devices 150 over a plurality of coverage areas 160, 170. The radio access network nodes are connected to a core network 180. Wireless devices 150 of different types connect to the core network 180 via the radio access network nodes 110, 120, 190.

The communication system may be part of a fifth generation (5G) communication system (5GS) as defined by the third generation partnership program (3GPP). However, the techniques disclosed herein are generally applicable, and can be implemented in other communication systems also. The access nodes in a 5GS are referred to herein as gNBs. The wireless devices may be referred to as user equipment (UE). It is appreciated that the use of the terms gNB and UE are for illustrating the general concepts of the techniques disclosed herein and should be construed broadly to incorporate general access points and wireless devices.

The term wireless device is to be construed broadly to comprise any type of wireless device which is configured to connect via radio link to an access point in a wireless communication system.

Federated learning is a machine learning (ML) technique which enables users to leverage the benefits of shared models trained from a large, distributed data set without the need of sharing the data with a central processing entity. The principal goal of an ML model is to optimize a loss function by, e.g., linear regression or logistic regression. The FL steps performed in a wireless communication system involving access nodes and wireless devices typically comprise 1) Local Model Training: After receiving the global/initial model, all UEs perform local training based on the global model to update their local weights. The updated weights of each local model are then sent back to the gNB for further processing.

2) Global Model Aggregation: The gNB receives the local weights from each UE and updates the global model weights and then send back the updated global model weights to all the participants in the FL process.

The training process, i.e., steps 1 and 2 above, is repeated until the desirable training accuracy is achieved. Various convergence criteria may be applied to determine when sufficient accuracy has been obtained. Such considerations are not part of the present disclosure and will therefore not be discussed in more detail herein.

The training of federated learning models normally requires multiple training rounds, i.e., more than one information exchange between the access node acting as central processing unit and the wireless devices participating in the FL process. Hence, FL processes in wireless communication systems normally comprise a lot of back and forth signaling before the model has reached a sufficient degree of convergence. When UEs are participating in the FL process, there are several issues that can occur, for example a UE might go into idle mode, execute a handover to some other access point, or go out of radio coverage, and therefore not be available for all rounds of the FL process. This can lead to slow model training, or even to an inaccurate model. Also, some of the wireless devices which are disconnected from the FL process before it has completed may carry important data sets locally, which would have contributed to increased model accuracy had the model been trained with these data sets as input. This problem can be particularly pronounced if certain types of data only become available at wireless devices which are promptly disconnected from the central processing unit upon obtaining the data.

A UE which participates in FL for a first cell, might transition from idle to active mode into a second cell, or perform a handover to a second cell. The UE can thus not continue to assist in the FL process in the first cell. This could for example cause a second UE, not learning the experiences from a first UE that participates in the FL (that will go into idle mode/handed over to a second node), for example which sequence of radio measurements that can cause a signal quality drop (radio link failure) in case the first UE experienced such situation. This would lead to unnecessary number of radio-link failures.

Another problem is that UEs might store a lot of data for each FL process, in the cells it has previously visited, since the FL procedure typically requires multiple rounds.

The problem with only having UEs available for a short period of time could cause long model training times for scenarios where the UEs are moving with high-speed, for example cells deployed along roads or railways. This scenario can cause that some data along cell-edges might not be represented in the models, since UEs will be disconnected before being able to include said data in the model. Suppose for instance that the FL process targets predicting the number of wolves in an area, but as soon as a wireless device detects a wolf, it gets eaten by the wolf, and thus disconnected from the access node. The FL will then result in a model which predicts that there are no wolves in an area, since all the reports it receives are indicate of zero wolf observations. Perhaps a more realistic scenario is a case where machine learning is used to predict received signal strength, and where rapid drops in signal strength in some area invariably leads to handover to some neighboring access point. The central entity will then not receive very many reports of rapidly decreasing signal strengths from some areas, since the wireless devices experiencing such conditions will disconnect from the access point performing the FL process. Thus, the ML model will be trained on a dataset lacking important information, which is undesired.

The present disclosure comprises a framework for performing FL with a UE served by a first access node which allows to resume the FL process when the UE is served by a second access node. The general concept comprises signaling in a radio access network (RAN) in order to enable a resumption of the FL process when the UE is instead served by a second node, even if the FL process was initiated, and is handled by, a first access node.

Figure 2:
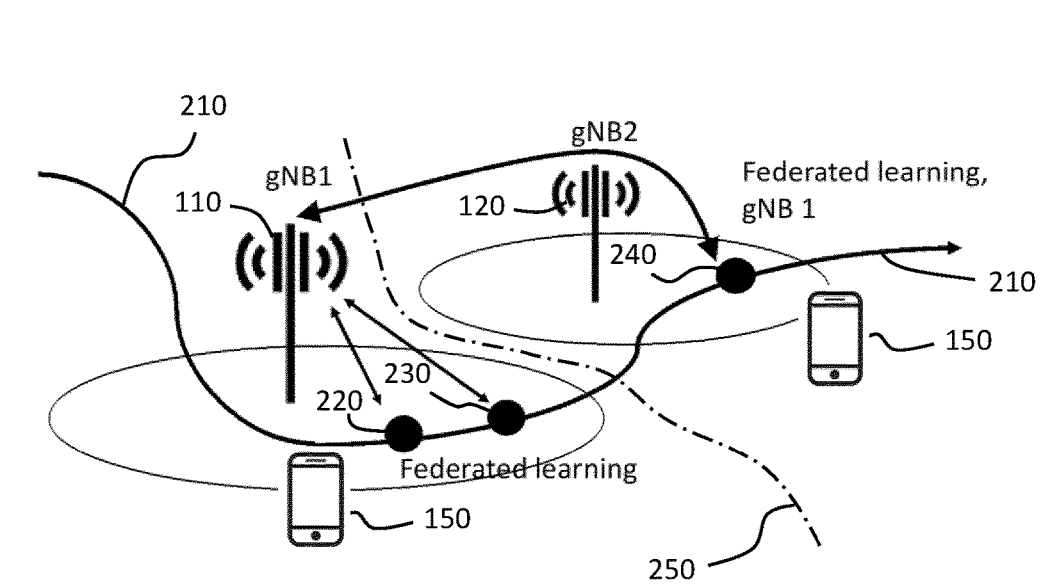
FIG. 2 schematically illustrates a federated learning process involving two network nodes.

FIG. 2 illustrates some of the main concepts of the technique. A wireless device 150 is moving along a path 210 through the coverage areas of a first access node 110, gNB1, and a second access node 120, gNB2. Suppose that the wireless device 150 and the first access node 110 initiates an FL process when the wireless device is connected to the first access node 110. The FL process may, e.g., comprise the training of a machine learning model which predicts radio coverage in different geographic locations in the node, reported from locations 220, 230 along the path 210, or training of a machine learning model used for compression of channel state information (CSI), or some other form of FL model process based on data available locally at the wireless device.

Before the FL process completes, the wireless device 150 is handed over to a second access node 120, whereupon direct connection between the wireless device 150 and the first access node 110 is lost. This is a potential problem since the data available locally at the wireless device no longer is accessible directly from the first access node 110. This data may comprise important data samples, e.g., related to the time period where radio coverage from the first access node 110 was poor enough to prompt the handover to the second access node 120, and its loss may therefore be highly undesired. The techniques proposed herein comprise a transmission of FL information from the first access node to the wireless device. This FL information enables the wireless device and the first access node to resume the FL process by communication via the second access node. Thus, by the methods proposed herein, the wireless device 150 can communicate with the first access node and thus take part in the FL process even from a location 240 outside of the coverage area of the first access node. This way the data samples obtained after the direct connection between the first access node and the wireless device was lost can still be used in the FL process.

Some of the advantages of the proposed techniques comprise faster converge of the FL process by the signaling between network nodes and signaling from the UE to a first and a second node. The proposed FL process information enables the UE to indicate where it has participated in FL, which can enable the first node to continue with the FL process via the second node.

In order to detect a node on another frequency using target carrier prediction as described, e.g., in WO 2017/162262 A1, a wireless device performs measurements and signaling of source carrier information. This is illustrated in FIG. 8, which shows a wireless device served on a first frequency (Frequency 1), which performs source carrier measurements in order to predict coverage on a second carrier frequency (Frequency 2) without energy consuming inter-frequency measurements.

The measurements on the plurality of beams in 5G new radio (NR) can enable the network to get an improved radio-fingerprint in comparison to previous technologies (e.g. LTE), this radio-fingerprint is referred to herein as radiolocation. A base station may generally use reference signals to obtain measurements performed by the UE on the beams transmitted by a base station, e.g., to assess the quality of the beams. In general, the reference signals transmitted by at least one base station to the UE may comprise at least one of a channel state information reference signal (CSI-RS), a synchronization signal block (SSB), a primary synchronization signal (PSS), a secondary synchronization signal (SSS), and a cell-specific reference signal (CRS). More specifically, a UE may assess beam qualities via measurements on the SSB (e.g., corresponding to a Synchronization Signal/Physical Broadcast Channel (PBCH) block) in a 5G (e.g., NR) network, or via measurements on the CSI-RS resources in a 5G (e.g., NR) network or a 4G (e.g., LTE) network.

The source carrier measurements comprise reference signal measurements in the UE serving and neighboring node, which denotes the radiolocation on frequency 1 reported from the UE, that is then used to predict coverage on a secondary frequency (radiolocation on frequency 2). The benefit is improved inter-frequency handovers. With more source carrier information reported (more detailed radiolocation on freq. 1) from the UE, improved prediction accuracy on the target frequency can be achieved. Another method is to use the geolocation of the device to predict the radiolocation on a non-serving carrier (radiolocation on frequency 2). This mapping between a geolocation to a radiolocation on frequency 2 can be executed using UE positioning system, e.g., GPS/GNSS, location as input, and optionally with the source carrier measurements (radiolocation on frequency 1). Using FL with geolocation as input, the UE privacy is maintained, since at no point in the solution, the UE provides better geo-location information to the network than Cell-ID based methods (which depends on the coverage range of the node). The GPS-accuracy is on the order of meters, while the Cell-ID is on order of the inter-site distance (100s of meters). Using GPS, the UE location can be determined more efficiently and accurately, leading to improved radiolocation prediction performance, in comparison to cell-ID based methods. In general, the UE can use ML with a measured set of radio signal qualities as input, to predict a set of non-measured radio-signal qualities. The invention is not limited to only measure set of radio-signal qualities on a first carrier to predict the radio-signal qualities on a secondary carrier, but it can also comprise to measure on a subset of beamforming reference signals (e.g. SSB, CSI-RS), in order to predict the signal qualities on a set of non-measured beamforming reference signals on the same frequency (for the serving and/or neighboring nodes). However, when training the model using FL; the UE needs to have been measuring the input radiolocation (e.g. radio measurements on freq.1, or certain subset of beamforming reference signals), with the radiolocation to be predicted in the inference step (e.g. radio measurements on frequency 2, or certain subset of beamforming reference signals).

In general, the advantages of the techniques proposed herein are more pronounced when a UE participating in FL has unique data, that is not present in other UEs.

For example, in the case of mapping a geolocation to a radiolocation, or a radiolocation on one frequency to a radiolocation on another frequency, a UE can have detected coverage for a non-served frequency (signal quality above a certain threshold) for a certain input. It is highly desired that this UE also includes the coverage information in the overall model, which otherwise may not be very accurate. Also, in the forecasted signal quality use case, the sequence of measurements that will forecast a coverage hole may be of importance. Using the present techniques, the first access node can transmit the parameters of the FL model to the UE when it reconnects via the second node. The UE can then test if the received latest update of model can detect said coverage holes or predict the radiolocation of a secondary frequency using radiolocation from a first frequency within a certain threshold range, present in the first UE local dataset for example. If the coverage hole is not detected by the model, the first UE can resume the FL with the first node via the second node in order to improve the model accuracy. This would lead to better performance since a second UE, connecting to the first node after the first UE, can take network action given the information of upcoming coverage holes (in case they are included in the model), for example by buffering traffic or by changing frequencies.

Other advantages relate to a reduced need for data storage in some UEs, since the UEs can be configured to remove the data and models associated to a certain FL process, in case the first node indicates via second node that the current model now meets the performance requirements.

As will be discussed in more detail below, the network optionally configures the UE to only report the FL process information to certain access points or cells, limiting the signaling overhead to only the second nodes that are able to support FL in a first node. It can also set thresholds on the channel qualities, hence only perform FL if channel is good enough. The network may also configure the UE with a priority metric for the one or more FL processes, for example the UE should prioritize to keep data related to a first use case, over a second use case. The UE might need to delete data related to a certain model to free memory. This enables the network to prioritize its most important use case.

Figure 3:
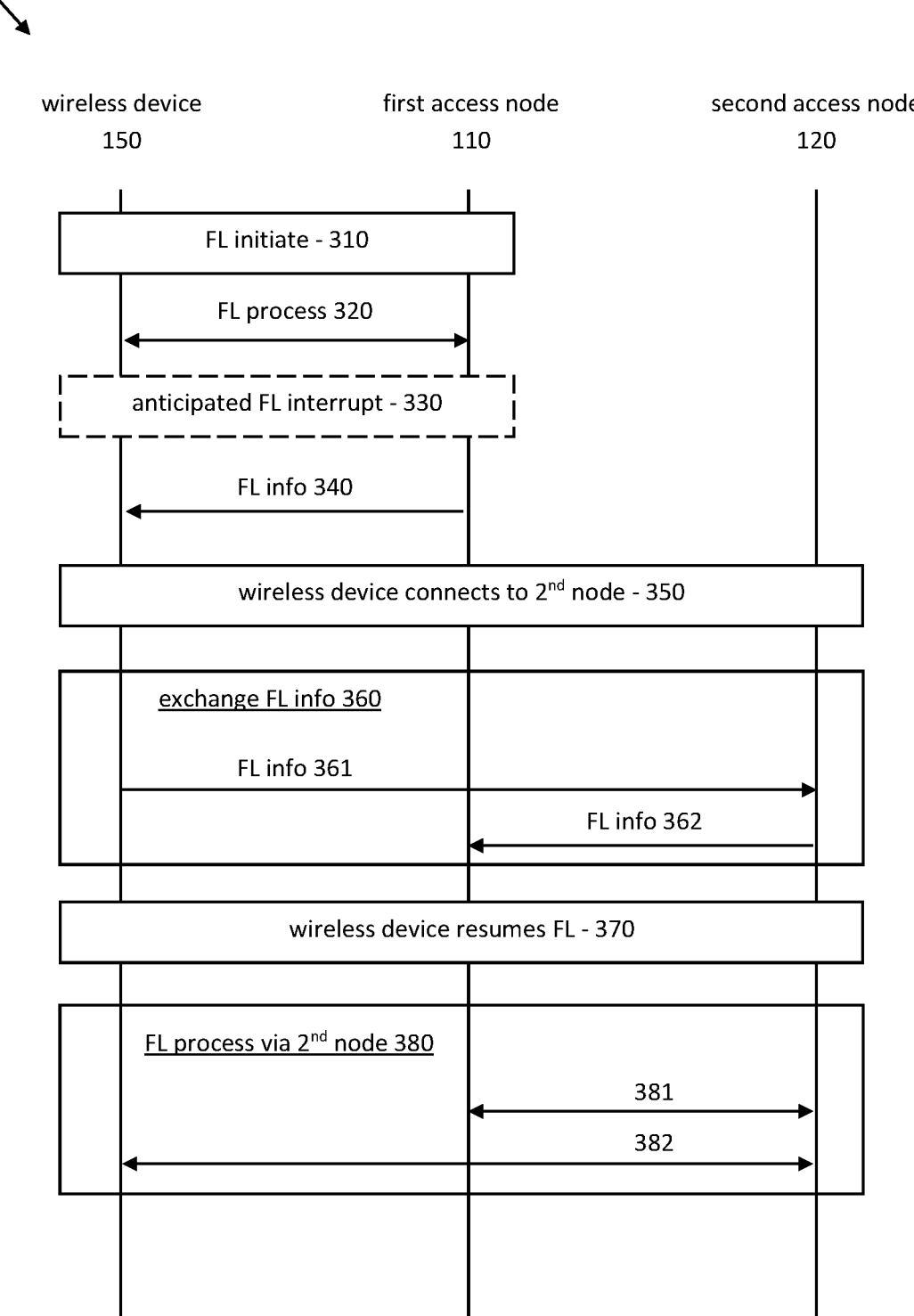
FIG. 3 is a signaling chart illustrating an example federated learning procedure.

FIG. 3 illustrates a signaling chart which describes an example of how the proposed techniques can be implemented to obtain at least some of the above-mentioned advantages. The signaling chart illustrates signaling exchange between a wireless device 150, a first access node 110 and a second access node 120.

The wireless device may, e.g., be a mobile terminal like a smartphone, a vehicle, or the like. The first and second access nodes 110, 120 may be radio base stations, or gNBs, in a 5G cellular access network, or some other type of access point. The FL process starts by FL initialization 310. This stage comprises configuring the different wireless devices in terms of what data to collect, and how to perform actions in response to the different messages transmitted from the first access node 110. The FL process 320 is controlled from the first access node 110, or by some other entity which connects to the wireless devices via the first access node. Generally, as explained above, an FL process comprises the wireless devices performing local updates to a model sent out by the central entity, in this case via the first access node 110. The first access node 110 or the entity acting through the first access node 110 then performs a global update based on the data received from the wireless devices 150, and then again sends out a request for model update based on the locally available data sets.

Optionally, there is a detection of an anticipated FL interruption 330, and the method is executed in response to this interruption. However, the methods may also be executed even if there is no interruption anticipated, as a precautionary measure.

In order to prepare for transfer to operation via a second access node, the first access node 110 transmits FL information 340 to the wireless device. The contents of this FL information will be discussed in more detail below. For now, suffice it to say that this information comprises data necessary or resuming the FL process via some other access node.

The wireless device then connects to a second access node 120, which is in some way connected to the first access node 110, meaning that it is possible to establish a path of communication between the wireless device 150 and the first access node 110 via the second access node 120.

The FL info is the communicated in the system 360, which may comprise the wireless device transmitting the FL info 361 to the second access node, which then forwards the FL info 362 to the first access node via the communication path.

The wireless device and the first access node are then able to resume the FL process 370, by communicating via the second access node. Thus, the FL process may continue 380, by messaging 381 between the wireless device 150 and the second access node 120, and by messaging 382 between the second access node 120 and the first access node 110.

It is appreciated that the communication between the wireless device 150 and the first access node 110 may traverse more than one node. I.e., the communication between the wireless device 150 and the first access node 110 may also traverse a third network node, a fourth network node, and so on.

FIGS. 4A-D are flow charts which provide an overview of the computer implemented methods for federated machine learning in wireless communication systems discussed herein. The methods comprise establishing Sa1 a first wireless access radio link 130 between a first access node 110 and a wireless device 150, followed by initiating Sa2, 310 an FL process 320 involving the first access node 110 and the wireless device 150. Different types of FL processes are possible, as mentioned above. Generally, the FL process is a process in which a machine learning function is trained based on data available locally at the wireless device, which data is not shared with the first access node. The FL process 320 may involve actions such as communicating model parameters to the wireless device 150 from the first access node 110 and receiving updated model parameters back from the wireless device 150, which the wireless device has determined based on the data available locally at the wireless device. An FL process is an iterative process which often involves a plurality of iterations, where the model parameters are successively refined until some convergence criteria has been achieved. As mentioned above, a problem with performing FL in wireless access networks involving wireless devices which may only be intermittently connected to a given access node is that the FL process may not have reached sufficient convergence when the connection between the first access node and the wireless device is lost, e.g., because the wireless device enters into idle mode or is handed over to some other access node.

To improve execution of FL methods in wireless access networks involving two or more access nodes 110, 120 and one or more wireless devices 150, the proposed methods comprise transmitting Sa4 FL information 340 from the first access node 110 to the wireless device 150, where the FL information comprises data indicative of the FL process. This FL information will be discussed in more detail below. Generally, the FL information relates to data which enables the particular FL operations to be resumed at some later point in time. A wireless device 150 having this FL information stored locally may, after having established Say, 350 a second wireless access radio link 140 to a second access node 120 which is communicatively coupled to the first access node 110, exchange Sa6, 360 at least part of the FL information 360 between the wireless device 150 and the second access node 120, and thereafter resume Sa1, 370 the FL process involving the first access node 110 and the wireless device 150 by communication 380 via the second access node 120 over the second wireless access radio link 140.

The second access node 120 is communicatively coupled to the first access node 110, meaning that it is possible to communicate messages between the first and the second access node, which can be realized in many different ways. For instance, it may be possible to connect the first access node to the second access node via backhaul link permanently or on-demand. However, in a preferred implementation the first access node 110 and the second access node 120 are connected to the same core network 170, as illustrated schematically in FIG. 1. In other words, the methods disclosed herein may comprise connecting Sa51 the second access node 120 to the first access node 110 via a core network 170.

The FL processes discussed herein can be used in a wide number of different applications in wireless access networks. For instance, FL processes can be used to train machine learning models which predict suitable radio carriers for use at different geographical locations, which is a problem discussed in PCT/EP2016/056122. UEs having both measurements on a first and a second carrier can contribute to building the model using FL. Due to the vast amount of carriers available in today's networks, it is important to utilize all data available for building such model. Transmitting all training data from UEs to a central processing station could be very costly since the number of measurements can be substantial. One can instead use FL to build such model. Building a model that finds the relation between carriers are important for subsequent UEs to identify the best carrier, it can thus be used to improve the overall throughput since it can be served by the best carrier (in terms of signal quality or throughput). To leverage on the past experiences by UEs when training the model, even when such UEs are no longer directly connected to the first network node 110, the methods allow continuing the training when the UE connects to the second node. The FL process information could in this use case also include the frequencies where it has logged data, i.e., the mapping from a first to a second frequency or vice versa. The FL process information could, e.g., comprise for which frequencies the UE should store data. Note that the UE could also store data during its idle period, this would enable the UE to also include new data when it reconnects from idle mode in the second cell. The UE can in one embodiment include a flag that it has new data, that is then transmitted to first node via the second node. In another example, the first node indicates which frequency relations where the UE should log during its idle mode period in order to potentially aid in the FL when (and if) it reconnects via the second node.

The FL methods disclosed herein may be advantageously used for joint training of an ML model for compressing channel state information (CSI). In such cases, the initiated FL process 310 comprises training Sa21 a machine learning function based on CSI data obtained locally by the wireless device 150. The ML model may, e.g., then be based on an autoencoder network. Autoencoders used in this application are known and will therefore not be discussed in more detail herein. Parameters, such as weights and optionally also the structure of the autoencoder network is then sent to the wireless devices participating in the training, which wireless devices train the model locally based on CSI information obtained by the respective wireless devices. A resulting structure, i.e., new updated parameters are then sent to the first access node 110 which merges the information into a lobal model, without the wireless devices having to communicate the actual data samples. This is particularly advantageous when it comes to CSI information, since this information may be rather extensive, especially for multi-antenna systems.

The FL methods disclosed herein may also be advantageously used for training Sa22 a machine learning function based on radiolocation and/or geolocation data obtained locally by the wireless device 150. This could, for instance, involve the prediction of radio performances associated with different radio carriers and the like.

The transmission of FL information 340 from the first access node 110 to the wireless device 150 may according to some examples be performed regularly. This allows the wireless device to facilitate resumption of the FL process in case the connection between the wireless device and the first access node should terminate unexpectedly. However, in many cases actions may be taken in response to an anticipated interruption Sa3, 330 of the initiated FL process 330. This could, for instance, be the case if the wireless device realizes that a handover may be imminent, due to received signal strength or other indicators. Also, the wireless device may detect that it is about to be turned off, for instance due to a user selecting a power-off command, or the battery level reaching critically low levels. Thus, according to some aspects, the anticipated interruption Sa31 of the FL process 330 comprises the wireless device 150 entering into an idle mode of operation. According to some other aspects the anticipated interruption Sa32 of the FL process 330 comprises the wireless device 150 entering into a handover operation. According to some further aspects the anticipated interruption Sa33 of the FL process 330 comprises the wireless device 150 entering into a recovery mode operation due to declaring a radio-link failure.

The wireless device and/or the first access node may be configured to monitor operations and detect when there is an increased risk for interruption of the FL process. This monitoring and interruption detection function may, e.g., be implemented as a set of indicators or event identifiers tabulated by the wireless device and/or by the first access node. One such event identifier could, as indicated above, be a low battery level, another such identifier could be an initiated handover process for handing over wireless access connection to a second access node 120, and so on. When interruption Sa3, 330, of the initiated FL process 330 is anticipated for some reason, the wireless device and/or the first access node may be configured to perform one or more tasks in order to facilitate resumption of the FL process.

One of the key parts of the herein disclosed methods relates to the transmission Sa41 of FL information 340. It is appreciated that this FL information may take on many different forms and may be more or less extensive in terms of information content. Some non-limiting examples of different types of FL information will now be given, where it is appreciated that these different types of information may be freely combined in dependence of the ML model which is trained and the type of FL process which has been initiated.

The FL information commonly but not necessarily comprises an FL process identifier. This FL process identifier may just be a code or some form of index value allowing a processing unit to identify the relevant FL process out of a plurality of different FL processes. This FL process identifier may also be used to access information in some third node which may be used as mediator or temporary data storage. For example, a wireless device wishing to resume a previously interrupted FL process can use the FL process identifier to access a database managed by some operations and maintenance node, and thus download the relevant information necessary for resuming the FL process.

The FL information may also comprise a priority metric indicating a priority of the FL process relative to one or more other FL processes in the wireless communication system 100, 200. A situation could for instance arise in which a communication throughput, data rate, storage capacity, or the like limits the number of FL processes which can be supported by the wireless device, by the first access node, and/or by the second access node. The priority metric may then form at least part of a basis for deciding which FL process or processes to proceed with, and which processes to terminate or put temporarily on hold until conditions change.

An FL process training round indicator value can be comprised in the FL information shared between the first access node 110 and the wireless device 150. This training round indicator can be used by the wireless device when the FL process is resumed to determine where it left off. For instance, the wireless device 150 can communicate this training round indicator value to the first access node as the FL process is resumed, and the first access node 110 may adapt the training process in dependence of the training round indicator value.

The FL information may also comprise a use-case description associated with the FL process. This use-case description may be a general description, possibly even readable by a human, enabling, e.g., an operator or technician to determine which FL processes a given wireless device has participated in. The use-case description may also be an abstract identifier which can be used by a processing unit performing an FL process to identify wireless devices which may store data samples relevant for a given use-case.

A set of global FL model weights associated with the FL process is often relevant to include in the FL information. These weights can be communicated to the first access node upon resumption of the process, thus informing the first access node about where the training process was interrupted. The first access node can then adjust the model training to account for the data coming from the wireless device resuming the FL process. The set of global FL model weights can also be used by the wireless device to determine if, at a future point in time, it has obtained new data which can be considered relevant to the model. For instance, the wireless device may notice that the current global model parameterized by the set of global FL model weights, is not able to accurately model the data gathered by the wireless device.

The FL information may also comprise various instructions which indicate a desired behaviour by the wireless device. The FL information may, e.g., comprise an instruction to store a dataset of the FL process, or a part of a dataset of the FL process. This may result in a more efficient FL system, since only datasets which the wireless device has been explicitly instructed to keep will be stored, while other datasets may potentially be deleted, at least if data storage in the wireless device 150 is limited. In a similar manner, the FL information may comprise an instruction indicating when stored FL process data can be deleted by the wireless device 150, or even an explicit instruction to delete one or more data items. This enables a more efficient data storage function by the wireless device, and may also improve data integrity, since sensitive data can be deleted on demand. In other words, the methods disclosed herein may comprise transmitting Sa8 an instruction to the wireless device 150 to delete a local data set related to the FL process.

An instruction indicating a set of access nodes in the wireless communication system 100, 200 with which FL information can be shared may also be comprised in the FL information. This option can be used by the first access node, or by some higher layer entity, to restrict data sharing involving the wireless device. For instance, the FL information may comprise information instructing the wireless device that it may share and participate in FL processes as long as it stays within some given network or sub-network. If the wireless device roams into another network, perhaps some network not managed by the same operator as the first access node, then restriction on data sharing may be put in place. This option may advantageously be combined with the instruction to delete sensitive data. Thus, if a wireless device leaves a trusted region of a wireless communication system, then the wireless device leaves the trusted region with an instruction to not share data with any network nodes encountered in the new part of the network, and perhaps also that the wireless device should remove any sensitive data which has been stored as a result of the participation in the FL process by the first access node 110.

To further improve data integrity and address various privacy issues which may arise, the FL information may comprise an instruction associated with encryption of the model parameters when communicating with the second node. This way a tunnel or virtual private network (VPN) can be created to the first access node via the second access node, which prevents the second access node, and also any other network nodes located on the communication path between the wireless device and the first access node form accessing the communicated data. To give an example, with reference to FIG. 2, suppose that the wireless device 150 approaches a hand-over region where handover between one operator network comprising gNB1 and another operator network comprising gNB2 takes place, perhaps in vicinity of the national border 250 between two countries. It may be desired to resume FL processes involving gNB1 and the wireless device 150 also after the wireless device 150 has entered into the coverage region of gNB2. However, the exchange may involve sensitive information. The first access node 110 may then distribute an encryption key to the wireless device 150 as part of the FL information, together with an instruction to encrypt all further exchanges of information related to the FL process. Once the wireless device 150 enters into the domain of gNB2, it may establish a connection to the first access node in a secure manner using the encryption key received from the first access node as part of the FL information. The wireless device may then, over the secure link, transmit, e.g., the FL process identifier together with a message informing the first access node 110 that resumption of the FL process over the encrypted link is possible, if the first access node should so desire. Of course, the wireless device may also transmit an encryption key to the first access node, allowing the first access node to encrypt messages sent to the wireless device using, e.g., public key cryptography methods.

Once the wireless device 150 has connected to the second access node 120, the second access node 120 optionally requests Sa61 the wireless device 150 to provide the FL information. Thus, a wireless device entering into the coverage region of the second access node may be polled by the second access node in order to discern if the wireless device is capable of participating in FL processes, and if so, what FL information it has to share, if any. The methods may also comprise transmitting Sa62 information from the wireless device 150 to the second access node 120 indicative of a set of access nodes where the wireless device has participated in an FL process. The second access node may then contact one or more access nodes in the set of access nodes where the wireless device has participated in an FL process to see if a resumption of that FL process is desired, in which case the second access node and/or the first access node may take the necessary steps to resume the FL process via the second access node.

According to some aspects, the method also comprises determining a throughput metric for communication between the wireless device 150 and the first access node 110 via the second access node 120 prior to resuming Sa71 the FL process between the first access node 110 and the wireless device 150. It could be the case that the communication link between the wireless device and the first access node is limited in terms of throughput, or is associated with high latency, or is unreliable for some reason. In this case resumption of the FL process via the second access node may not be possible, since there is not enough bandwidth to exchange the necessary information between the wireless device and the first access node, or that the FL process will be too costly. These aspects are advantageously combined with the above-discussed aspects relating to FL process priority. If the link between the wireless device 150 and the first access node 110 via the second access node 120 is limited in terms of bandwidth, then the priority metric can be used to select which FL process to support and which FL processes to abandon or temporarily place on hold.

It is furthermore appreciated that some local data sets may be more important than other local data sets. Generally, new data not previously seen from a global point of view is more likely to contribute to the global machine learning model that data sets which have already been accounted for in the training of the model. This may be particularly relevant for data sets having a dependence on geographical position. The wireless devices 150 performing handover to the second access node may gather valuable data during this handover operation, which data will be out of reach for the first access node if the methods proposed herein are not implemented. However, if the methods proposed herein are used, then the data can be made available to the first access node via the second access node. In consideration of this, according to some aspects, the methods comprise determining a relevance metric associated with a local data set of the wireless device 150 for the FL process prior to resuming Sa72 the FL process between the first access node 110 and the wireless device 150. This allows, e.g., the first access node 110 to determine whether it would make sense to resume an FL process using data from a given wireless device 150. This type of relevance metric can. e.g., be determined based on how much a model changes after the data set has been used in training, where a very small change in model parameters after training by the data set indicates a low relevance compared to a case where the model parameters change more. Various types of distance metrics between data sets can also be used. For instance, if a wireless device has acquired some data which has been used in model training and then measures new data which has not yet influenced the global model, the wireless device can determine a distance metric, such as a Kullback-Leibler distance between distributions of the data, or some form of norm distance like and Euclidean distance between the previous data and the newly acquired data. If this distance metric is large, then it is likely that the new data represents a previously unseen event or condition and may therefore be valuable for inclusion in the global model and should consequently be assigned a high relevance metric. If the new data is more or less the same as that already seen, the relevance metric will be lower. The exact functions and methods to use in determining relevance metrics varies from case to case, and can be determined, e.g., by experimentation and computer simulation, or by more analytical methods involving, e.g., mathematical analysis of the problem at hand. Just the fact that data has been relayed via one or more other nodes, such as the second access node, may also be used as a relevance metric.

The methods disclosed herein optionally comprise determining an energy storage state of the wireless device 150 prior to resuming Sa73 the FL process between the first access node 110 and the wireless device 150. The energy storage state of the wireless device may also play a role in the determining of whether to resume the FL process via the second network node or not. A wireless device participating in an FL process is likely to consume more energy compared to a wireless device which is not participating in an FL process. Thus, if the wireless device risks having its energy store depleted by participating in the FL process, it may be desired to terminate the FL process or at least postpone the FL process until the wireless device has replenished its energy storage, i.e., by charging its battery or by being plugged into electrical mains.

Figure 4A:
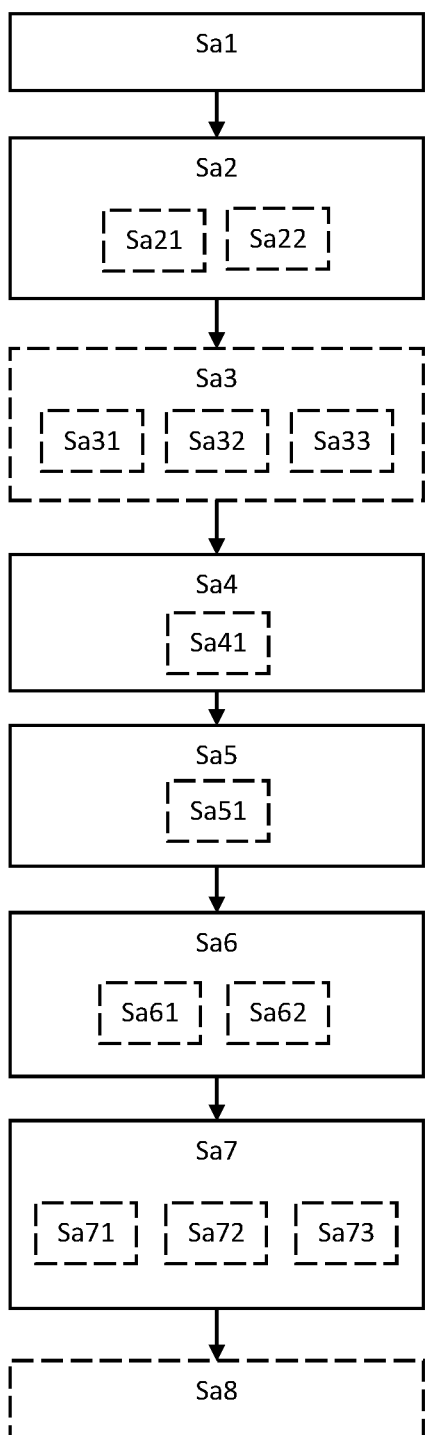
FIGS. 4A-D are flow charts illustrating methods.
Figure 4B:
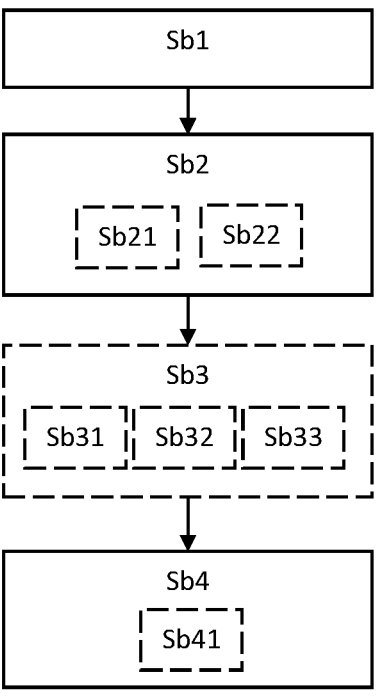
Figure 4C:
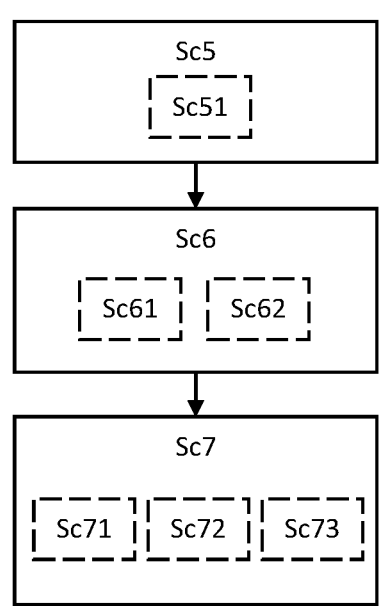
Figure 4D:
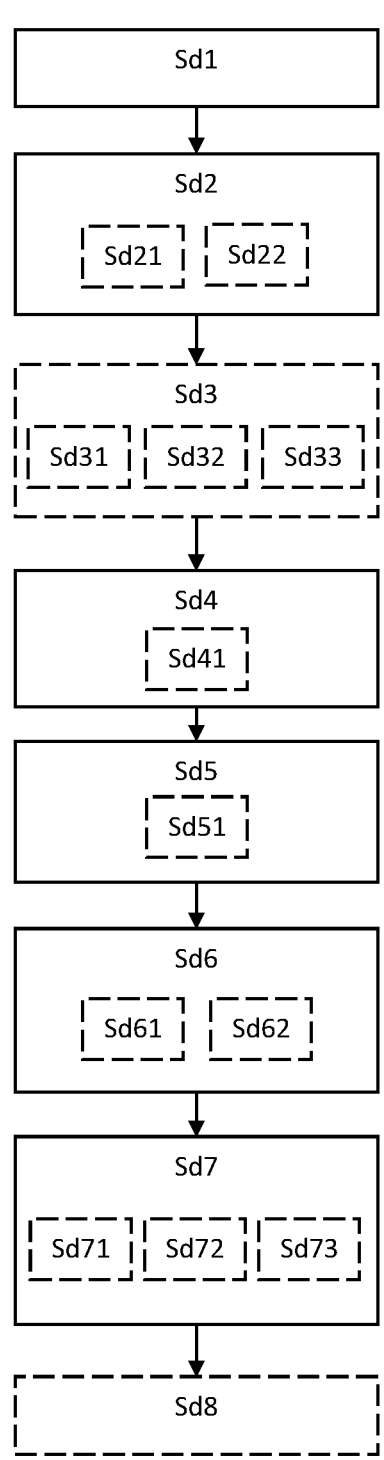

It is appreciated that the methods discussed above are performed by a number of different entities in collaboration with each other. The first access node performs one set of functions, the second access node performs another set of functions, at least partially overlapping the set of functions performed by the first access node, and the wireless device communicates with both the first access nodes and with the second access node during the FL process. Thus, it is appreciated that the methods disclosed herein may be implemented in different types of network nodes. FIG. 4A illustrates the methods from a systems perspective, comprising the functions performed by the combination of network nodes. FIG. 4B, on the other hand, only shows the functions performed by the first access node 110. FIG. 4C illustrates the disclosed methods from the point of view of the second access node 120, while FIG. 4D shows the different operations and actions performed by the wireless device as it performs relevant parts of the methods.

FIG. 4B illustrates a computer implemented method for federated machine learning (FL) performed in a first access node 110. The method comprises establishing Sb1 a first wireless access radio link 130 between the first access node 110 and a wireless device 150, initiating Sb2, 310 an FL process 320 involving the first access node 110 and the wireless device 150, and transmitting Sb4 FL information 340 from the first access node 110 to the wireless device 150, where the FL information comprises data indicative of the FL process.

According to aspects, the initiated FL process 310 comprises training Sb21 a machine learning function based on CSI data obtained locally by the wireless device 150.

According to aspects, the initiated FL process 310 comprises training Sb22 a machine learning function based on radiolocation and/or geolocation data obtained locally by the wireless device 150.

According to aspects, the method is performed in response to an anticipated interruption Sb3, 330 of the initiated FL process 330.

With reference to FIG. 6, there is also disclosed herein a first access node 110, comprising processing circuitry 610, a network interface 620 coupled to the processing circuitry 610, and a memory 630 coupled to the processing circuitry 610, wherein the memory comprises machine readable computer program instructions that, when executed by the processing circuitry, causes the network node to:

establish Sb1 a first wireless access radio link 130 between the first access node 110 and a wireless device 150, initiate Sb2, 310 an FL process 320 involving the first access node 110 and the wireless device 150, and transmit Sb4 FL information 340 from the first access node 110 to the wireless device 150, where the FL information comprises data indicative of the FL process.

FIG. 4C illustrates a computer implemented method for federated machine learning (FL) performed in a second access node 120, where the second access node 120 is communicatively coupled to a first access node 110. The method comprises establishing Sc5, 350 a second wireless access radio link 140 between the second access node 120 and a wireless device 150, exchanging Sc6, 360 FL information 360 related to an initiated FL process between the wireless device 150 and the second access node 120, where the FL information has previously been communicated between the first access node 110 and the wireless device, and facilitating resumption Sc7, 370 of an FL process involving the first access node 110 and the wireless device 150 by forwarding communication 380 between the wireless device 150 and the first access node 110 via the second access node 120 over the second wireless access radio link 140.

With reference to FIG. 6, there is also disclosed herein a second access node 120, where the second access node 120 is communicatively coupled to a first access node 110, the second access node comprising processing circuitry 610, a network interface 620 coupled to the processing circuitry 610, and a memory 630 coupled to the processing circuitry 610, wherein the memory comprises machine readable computer program instructions that, when executed by the processing circuitry, causes the network node to:

establish Sc5, 350 a second wireless access radio link 140 between the second access node 120 and a wireless device 150, exchange Sc6, 360 FL information 360 related to an initiated FL process between the wireless device 150 and the second access node 120, where the FL information has previously been communicated between the first access node 110 and the wireless device, and facilitate resumption Sc7, 370 of an FL process involving the first access node 110 and the wireless device 150 by forwarding communication 380 between the wireless device 150 and the first access node 110 via the second access node 120 over the second wireless access radio link 140.

FIG. 4C illustrates a computer implemented method for federated machine learning, FL, performed in a wireless device 150. The method comprises establishing Sd1 a first wireless access radio link 130 between a first access node 110 and the wireless device 150, initiating Sd2, 310 an FL process 320 involving the first access node 110 and the wireless device 150, receiving Sd4 FL information 340 from the first access node 110, where the FL information comprises data indicative of the FL process, establishing Sd5, 350 a second wireless access radio link 140 between a second access node 120 and the wireless device 150, where the second access node 120 is communicatively coupled to the first access node 110, exchanging Sd6, 360 at least part of the FL information 360 between the wireless device 150 and the second access node 120, and resuming Sd7, 370 the FL process involving the first access node 110 and the wireless device 150 by communication 380 via the second access node 120 over the second wireless access radio link 140.

With reference to FIG. 6, there is also disclosed herein a wireless device 150, comprising processing circuitry 610, a network interface 620 coupled to the processing circuitry 610, and a memory 630 coupled to the processing circuitry 610, wherein the memory comprises machine readable computer program instructions that, when executed by the processing circuitry, causes the network node to:

establish Sd1 a first wireless access radio link 130 between a first access node 110 and the wireless device 150, initiate Sd2, 310 an FL process 320 involving the first access node 110 and the wireless device 150, receive Sd4 FL information 340 from the first access node 110, where the FL information comprises data indicative of the FL process, establish Sd5, 350 a second wireless access radio link 140 between a second access node 120 and the wireless device 150, where the second access node 120 is communicatively coupled to the first access node 110, exchange Sd6, 360 at least part of the FL information 360 between the wireless device 150 and the second access node 120, and resume Sd7, 370 the FL process involving the first access node 110 and the wireless device 150 by communication 380 via the second access node 120 over the second wireless access radio link 140.

FIG. 5 illustrates various realizations 500 of the methods discussed above. The methods discussed above may be implemented in a 5G node which could be deployed in a centralized manner or in a virtual node in the communications network 100. The split between the physical node and the centralized node can be on different levels. Parts of the proposed methods may of course also be implemented on a remote server comprised in a cloud-based computing platform.

FIG. 6 schematically illustrates, in terms of a number of functional units, the general components of a network node 600 according to embodiments of the discussions herein. Processing circuitry 610 is provided using any combination of one or more of a suitable central processing unit CPU, multiprocessor, microcontroller, digital signal processor DSP, etc., capable of executing software instructions stored in a computer program product, e.g., the form of a storage medium 630. The processing circuitry 610 may further be provided as at least one application specific integrated circuit ASIC, or field programmable gate array FPGA.

Particularly, the processing circuitry 610 is configured to cause the device 600 to perform a set of operations, or steps, such as the methods discussed in connection to FIGS. 4A-D and the discussions above. For example, the storage medium 630 may store the set of operations, and the processing circuitry 610 may be configured to retrieve the set of operations from the storage medium 630 to cause the device to perform the set of operations. The set of operations may be provided as a set of executable instructions.

Thus, the processing circuitry 610 is thereby arranged to execute methods as herein disclosed. In other words, there is shown a network node 1600, comprising processing circuitry 610, a network interface 620 coupled to the processing circuitry 610 and a memory 630 coupled to the processing circuitry 610, wherein the memory comprises machine readable computer program instructions that, when executed by the processing circuitry, causes the network node to execute one or more of the operations, functions and methods discussed herein.

The storage medium 630 may also comprise persistent storage, which, for example, can be any single one or combination of magnetic memory, optical memory, solid state memory or even remotely mounted memory.

The device 600 may further comprise an interface 620 for communications with at least one external device. As such the interface 620 may comprise one or more transmitters and receivers, comprising analogue and digital components and a suitable number of ports for wireline or wireless communication.

The processing circuitry 610 controls the general operation of the device 600, e.g., by sending data and control signals to the interface 620 and the storage medium 630, by receiving data and reports from the interface 620, and by retrieving data and instructions from the storage medium 630. Other components, as well as the related functionality, of the control node are omitted in order not to obscure the concepts presented herein.

FIG. 7 illustrates a computer readable medium 710 carrying a computer program comprising program code means 720 for performing the methods illustrated in, e.g., FIGS. 4A and 4B, when said program product is run on a computer. The computer readable medium and the code means may together form a computer program product 700.

The invention claimed is:

1. A computer implemented method for federated machine learning, FL, in a wireless communication system, the method comprising:

establishing a first wireless access radio link between a first access node and a wireless device, initiating an FL process involving the first access node and the wireless device, transmitting FL information from the first access node to the wireless device, where the FL information comprises data indicative of the FL process, establishing a second wireless access radio link between a second access node and the wireless device, where the second access node is communicatively coupled to the first access node, exchanging at least part of the FL information between the wireless device and the second access node, and resuming the FL process involving the first access node and the wireless device by communication via the second access node over the second wireless access radio link.

2. The method according to claim 1, where the wireless communication system is a system operating according to a standard defined by the third generation partnership program, 3GPP.

3. The method according to claim 1, where the initiated FL process comprises training a machine learning function based on channel state information, CSI, data obtained locally by the wireless device.

4. The method according to claim 1, where the initiated FL process comprises training a machine learning function based on radiolocation(s) and/or geolocation data obtained locally by the wireless device.

5. The method according to claim 1, performed in response to an anticipated interruption of the initiated FL process.

6. The method according to claim 5, wherein the anticipated interruption of the FL process comprises the wireless device entering into an idle mode of operation.

7. The method according to claim 5, wherein the anticipated interruption of the FL process comprises the wireless device entering into a handover operation.

8. The method according to claim 5, wherein the anticipated interruption of the FL process comprises the wireless device entering into a recovery mode of operation due to declaring radio-link failure.

9. The method according to claim 1, comprising transmitting FL information comprising any of:

an FL process identifier, a priority metric indicating a priority of the FL process relative to one or more other FL processes in the wireless communication system, an FL process training round indicator value, a use-case description associated with the FL process, a set of global FL model weights associated with the FL process, an instruction to store a dataset of the FL process, or a part of a dataset of the FL process, an instruction indicating when stored FL process data can be deleted by the wireless device, an instruction indicating a set of access nodes in the wireless communication system with which FL information can be shared, and/or an instruction associated with encryption of the model parameters when communicating with the second node.

10. The method according to claim 1, comprising connecting the second access node to the first access node via a core network.

11. The method according to claim 1, comprising the second access node requesting the wireless device to provide the FL information.

12. The method according to claim 1, comprising transmitting information from the wireless device to the second access node indicative of a set of access nodes where the wireless device has participated in an FL process.

13. The method according to claim 1, comprising determining a throughput metric for communication between the wireless device and the first access node via the second access node prior to resuming the FL process between the first access node and the wireless device.

14. The method according to claim 1, comprising determining a relevance metric associated with a local data set of the wireless device for the FL process prior to resuming the FL process between the first access node and the wireless device.

15. The method according to claim 1, comprising determining an energy storage state of the wireless device prior to resuming the FL process between the first access node and the wireless device.

16. The method according to claim 1, comprising transmitting an instruction to the wireless device to delete a local data set related to the FL process.

17. A computer implemented method for federated machine learning, FL, performed in a first access node, the method comprising:

establishing a first wireless access radio link between the first access node and a wireless device, initiating an FL process involving the first access node and the wireless device, and transmitting FL information from the first access node to the wireless device, where the FL information comprises data indicative of the FL process.

18. The method according to claim 17, where the initiated FL process comprises training a machine learning function based on CSI data obtained locally by the wireless device.

19. A computer implemented method for federated machine learning, FL, performed in a second access node, where the second access node is communicatively coupled to a first access node, the method comprising:

establishing a second wireless access radio link between the second access node and a wireless device, exchanging FL information related to an initiated FL process between the wireless device and the second access node, where the FL information has previously been communicated between the first access node and the wireless device, and facilitating resumption of an FL process involving the first access node and the wireless device by forwarding communication between the wireless device and the first access node via the second access node over the second wireless access radio link.

20. A computer implemented method for federated machine learning, FL, performed in a wireless device, the method comprising:

establishing a first wireless access radio link between a first access node and the wireless device, initiating an FL process involving the first access node and the wireless device, receiving FL information from the first access node, where the FL information comprises data indicative of the FL process, establishing a second wireless access radio link between a second access node and the wireless device, where the second access node is communicatively coupled to the first access node, exchanging at least part of the FL information between the wireless device and the second access node, and resuming the FL process involving the first access node and the wireless device by communication via the second access node over the second wireless access radio link.

* * * * *